United States Patent [19]
Collins

[11] 4,226,438
[45] Oct. 7, 1980

[54] TRAILER HITCH GUIDE

[76] Inventor: Walter L. Collins, 10225 A. Synott Rd., Sugarland, Tex. 77478

[21] Appl. No.: 2,697

[22] Filed: Jan. 11, 1979

[51] Int. Cl.² .............................................. B60D 1/00
[52] U.S. Cl. ..................................... 280/477; 280/507
[58] Field of Search ................................ 280/507, 477

[56] References Cited

U.S. PATENT DOCUMENTS

| | | | |
|---|---|---|---|
| 3,012,797 | 12/1961 | Manting | 280/507 |
| 3,747,958 | 7/1973 | Hackett | 280/477 |
| 3,773,356 | 11/1973 | Eichels | 280/477 |
| 3,944,259 | 3/1976 | Miller | 280/477 |

Primary Examiner—John P. Silverstrim
Attorney, Agent, or Firm—Neal J. Mosely

[57] ABSTRACT

A guide surrounding a trailer hitch ball protects the bumper and the rear end of the vehicle from damage by the trailer hitch member during connection thereof, and comprises a plate secured under the trailer hitch ball and having vertically extending wall portions which join at the rear of the trailer hitch ball in an obtuse dihedral angle. The guide functions to guide the trailer hitch member into cooperating engagement with the trailer hitch ball carried on the vehicle without allowing the same to engage the bumper or rear end portion of the vehicle. The side walls of the guide are sufficiently high to protect the trailer hitch ball from engaging and locking with the bumper of a vehicle used to push the vehicle having the trailer hitch ball installed.

7 Claims, 4 Drawing Figures

TRAILER HITCH GUIDE

BACKGROUND OF THE INVENTION

1. Field of the Invention

This invention relates to new and useful improvements in guards or guide members to be used with trailer hitch ball connectors on the rear of motor vehicles to prevent damage to the rear of the vehicle or the bumper during assembly of the trailer hitch connection.

2. Brief Description of the Prior Art

Vehicles which are used to pull trailers are often equipped with a permanent trailer hitch supported on the rear bumper or on a draft bar supported on the rear bumper or on the frame of the vehicle. The trailer hitch comprises a trailer hitch ball connector member supported on the bumper or on the draft bar which is mounted in an upright position to be received in a downwardly opening cooperating trailer hitch member. The trailer hitch member may be a tongue member or other structure extending from the trailer and having an opening to receive a ball member and to be locked thereon.

During periods when there is no trailer connected to the draft vehicle, the trailer hitch ball connector member is normally left mounted on the vehicle and may interfere with normal bumper contact between the draft vehicle and another vehicle approaching from or parked to the rear thereof. When two such vehicles make contact, the trailer hitch ball may lock under the bumper of the vehicle located behind and cause damage. Another problem which is even more substantial, is the problem of damage to the bumper or rear end of the draft vehicle during assembly of the trailer hitch connection. When the trailer is moved into engagement with the ball connector, an incomplete connection often occurs and, in fact, the trailer hitch member often will engage the bumper or the rear end of the vehicle to one side or the other of the trailer hitch ball connector member. This may occur whether the trailer is being moved to engage the ball connector member or the vehicle is being moved to engage the ball connector member with the trailer hitch member. As a result of both of these problems, there has been need for a suitable trailer hitch ball guard and guide member.

Anderson U.S. Pat. No. 3,841,664 discloses a guard member for trailer hitches which provides some protection against collision of a vehicle from behind with the trailer hitch ball connector. The guard, however, does not provide for guiding the separate members of the trailer hitch during connection thereof.

Manting U.S. Pat. No. 3,012,797 discloses another type of trailer hitch ball guard which provides protection against rear end collision but does not provide the desired protection and guiding function during assembly of the trailer hitch connection.

Lusigman U.S. Pat. No. 3,522,958 discloses a trailer hitch locking mechanism. The mechanism disclosed functions well as a lock but does not provide either the desired guard or guiding functions.

Allen U.S. Pat. No. 4,032,171 discloses another trailer hitch locking device. This device, however, does not provide the desired guarding and guiding functions during assembly of the hitch.

Pfeiffer U.S. Pat. No. 2,441,285, Wade U.S. Pat. No. 3,161,422, and Patterson U.S. Pat. No. 3,912,302 disclose guide members for assembly of pin-type connectors for connecting tractors to vehicles to be towed. These guide mechanisms are relatively complicated to manufacture and the design features disclosed are not applicable to a trailer hitch on an ordinary motor vehicle.

SUMMARY OF THE INVENTION

One of the objects of this invention is to provide a new and improved trailer hitch guide which guides the trailer hitch member into engagement with a trailer hitch ball connector member without damage to the vehicle on which the ball connector member is positioned.

Another object of this invention is to provide a new and improved trailer hitch connection having a guide member which assists in making the connection and which provides protection for the trailer hitch ball connector when a vehicle is not being towed.

Other objects of this invention will become apparent from time to time throughout the specifications and the claims as hereinafter related.

A guard for shielding a trailer hitch ball to protect the bumper and the rear end of the vehicle from damage by the trailer hitch member during connection thereof comprises a guard plate secured under the trailer hitch ball and having vertically extending wall portions which join at the rear of the trailer hitch ball in an obtuse dihedral angle. The guard functions to guide the trailer hitch member into cooperating engagement with the trailer hitch ball carried on the vehicle without allowing the same to engage the bumper or rear end portion of the vehicle. The side walls of the guard are sufficiently high to protect the trailer hitch ball from engaging and locking with the bumper of a vehicle used to push the vehicle having the trailer hitch ball installed.

DESCRIPTION OF THE PREFERRED EMBODIMENT

Figure 1:
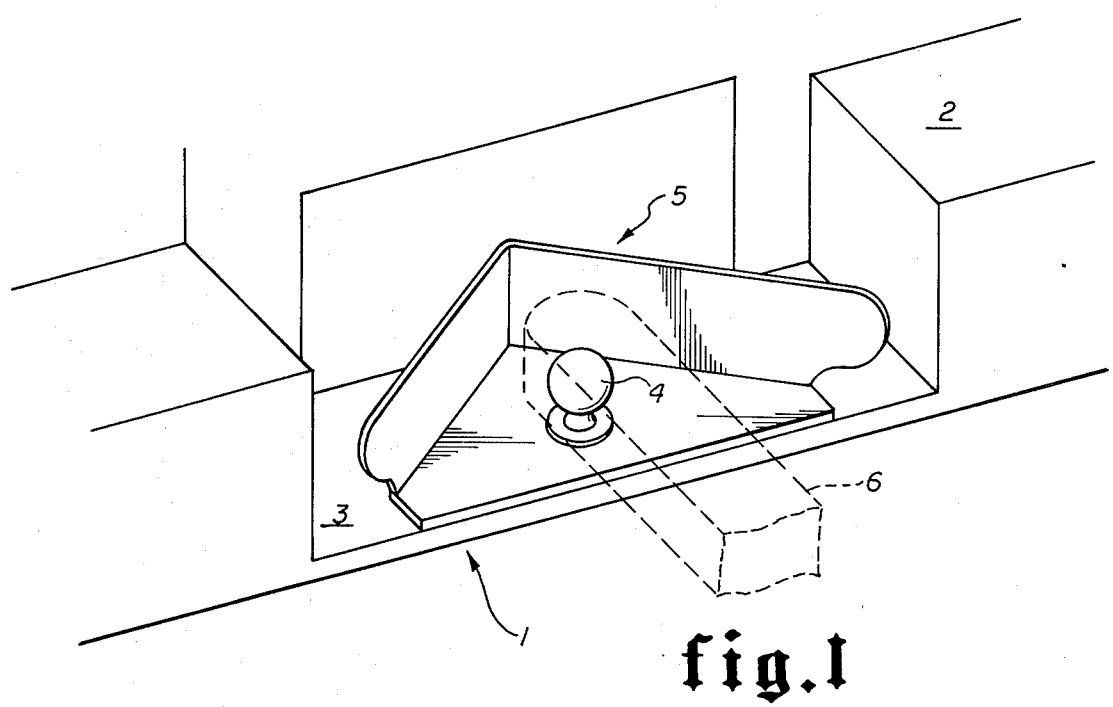
FIG. 1 is a view at an oblique angle of a portion of the rear end of a vehicle showing a trailer hitch guide member installed on the bumper of the vehicle.

Referring to the drawings by numerals of reference and more particularly to FIG. 1, there is shown the rear portion 1 of a motor vehicle including a rear bumper 2 having a stepped recess 3 for supporting a trailer hitch ball connector member 4. The structure shown is a relatively typical construction for the rear portion of a pickup truck. On other types of vehicles not having this bumper construction, the trailer hitch ball connector member 4 would be supported on a suitable draft bar which would be horizontally connected to the bumper or to the frame of the motor vehicle. Trailer hitch ball connector member 4 is supported in a guide and guard member 5 which is shown in more detail in FIGS. 2, 3 and 4. The guide 5 is used to guide the hitch member of any type of trailer into operating engagement with ball connector member 4. In FIG. 1, the trailer hitch member is shown schematically in dotted line as member 6. Member 6 can be any member which is a part of a trailer or extending from a trailer and having the cooperating recess which fits over ball connector member 4 and is secured thereon for pulling the trailer by the draft vehicle.

Figure 2:
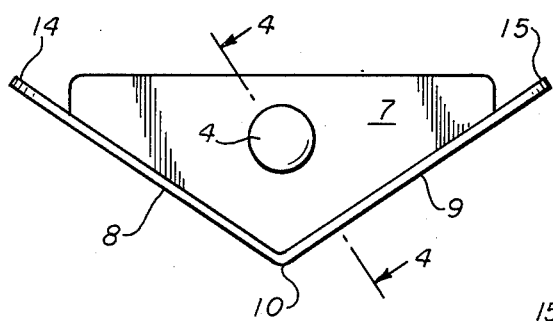
FIG. 2 is a plan view of the trailer hitch guide member shown in FIG. 1.
Figure 3:
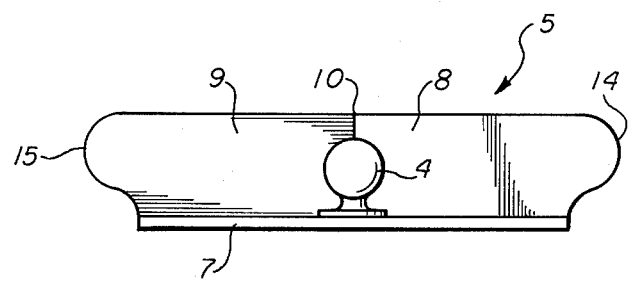
FIG. 3 is a view in elevation of the trailer hitch guide member shown in FIGS. 1 and 2.
Figure 4:
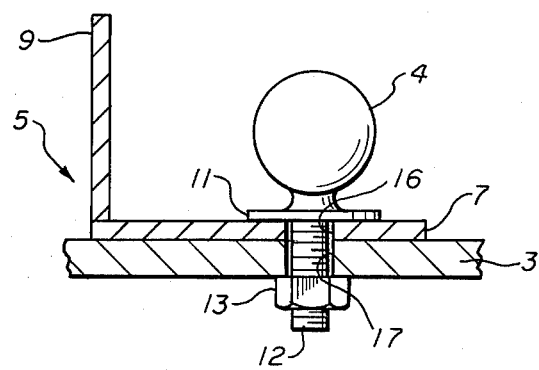
FIG. 4 is a view in section taken on the section line 4—4 of FIG. 2.

In FIGS. 2, 3 and 4, the guide and guard member 5 is shown in more detail and the mode of connection in association with the trailer hitch ball connector member 4 is also illustrated. Member 5 is of a one-piece construction including base plate 7 and upstanding wall portion 8 and 9 extending therefrom. Wall portions 8 and 9 form a 90 degree dihedral angle with base plate 7. Wall portions 8 and 9 meet at 10 at the rear of the guide member 5 and form an obtuse dihedral angle with each other.

Guide member 5 is normally supported on the flat portion 3 of bumper 2 with ball member 4 secured in place as shown in FIG. 4. Ball member 4 includes an enlarged flange portion 11 which fits over guide member 5 and holds the same against bumper portion 3. Ball member 4 has a threaded stem portion 12 which extends through base plate 7 and bumper 3 and is secured in place by threaded nut 13. The assembly of the ball member 4 and guide plate 5 would be the same when installed on a draft bar instead of a bumper. In such an arrangement, the view shown in FIG. 4 would be exactly as presently shown except that the portion illustrated as flat portion 3 of bumper 2 would be the draft bar for pulling the trailer. It should be noted that the end portions 14 and 15 of sidewall members 8 and 9 are curved as shown and extend forwardly of ball member 4. This arrangement provides protection in the event of a rear end collission as well as providing a guiding function for guiding trailer hitch member 6 into position. The curvature of the ends 14 and 15 of sidewalls 8 and 9 also permits the trailer tongue to pivot further from side to side when connected.

OPERATION

The operation of this equipment should be more or less obvious from the foregoing description of its construction. The guide and guard member 5 is installed by placing it on the flat surface 3 of bumper 2 or on upper flat surface of a draft bar attached to the vehicle frame. Guide member 5 is positioned with the hole 16 positioned over the corresponding hold 17 in the bumper or draft bar. Trailer hitch ball member 4 is positioned with threaded portion 12 extending through holes 16 and 17 and nut 13 is tightened into place so that flange 11 secures trailer hitch ball member 4 into position and secures guide member 5 in the position shown.

In the position shown in the drawings, guide member 5 acts as a guard to prevent the trailer hitch member 6 from moving against bumper 2 or against the rear portion of the vehicle to damage the same when an attempt is made to fasten the trailer hitch member to the ball connector member 4. When the vehicle is backed against the end of trailer hitch member 6 or if trailer hitch member 6 is moved against the rear portion of the vehicle, the end of trailer hitch member 6 engages sidewall portions 8 and 9 of guide member 5 and is guided to a position over ball connector member 4 for installation and locking. This prevents damage to the rear end of the vehicle or the bumper during assembly of the hitch. When the trailer is disconnected from the vehicle, the guide and guard member 5 also functions as a guard to prevent damage to ball member 4 in the event of a rear end collision at low speed.

While this invention has been described fully and completely with special emphasis upon a preferred embodiment which represents the best mode of carrying out the invention, it should be understood that within the scope of the appended claims the invention may be practiced otherwise than as specifically described and shown herein.

I claim:

1. A trailer hitch assembly for a draft vehicle comprising
   a draft member adapted to be supported at the rear end of said vehicle,
   a ball connector member supported in an upright position on said draft member and rigidly secured thereon,
   a guide member supported on said draft member and surrounding said ball connector member on the sides and rear thereof and having sidewalls positioned to guide a trailer hitch member into centered relation relative to said ball connector member during assembly of the hitch connection, and
   said guide member comprising a unitary piece having a base plate and a pair of upstanding sidewalls,
   said sidewalls each forming a right dihedral angle with said base plate, and said sidewalls meeting at a point rearward of said ball connector member in an obtuse dihedral angle,
   the ends of said sidewalls extending forwardly of said ball connector member and having curved end edges having a curved relieved portion permitting greater angular movement of the hitch.

2. A trailer hitch assembly according to claim 1 in which said base plate and said draft member have aligned apertures and said ball connector member has a threaded extension extending therethrough and secured thereon by a nut on said threaded extension.

3. A trailer hitch assembly according to claim 1 in which said sidewalls each extend above said ball connector member.

4. A guide member for a ball connector member supported in an upright position on a draft member on the rear end on a draft vehicle, said guide member surrounding said ball connector member on the sides and rear thereon and having side walls positioned to guide a trailer hitch into centered position relative to said ball connector member during assembly of the hitch connection, and
   said guide member comprising a unitary piece having a base plate and a pair of upstanding sidewalls,
   said sidewalls each forming a right dihedral angle with said base plate, and said sidewalls meeting at a point rearward of said ball connector member in an obtuse dihedral angle,
   the ends of said sidewalls extending forwardly of said ball connector member and having curved end edges having a curved relieved portion permitting greater angular movement of the hitch.

5. A guide member according to claim 4 in which said guide member when assembled on said draft member with said ball connector member has said base plate member positioned between said ball connector member and said draft member and said sidewalls extend forwardly of said ball connector member.

6. A guide member according to claim 5 in which said base plate has an aperture adapted for alignment with a like aperture in said draft member and said ball connector member has a threaded extension adapted to be inserted through said apertures when so aligned and secured by a nut thereon.

7. A guide member according to claim 5 in which said sidewalls are of a size extending above said ball connector member when assembled therewith.

* * * * *